(12) United States Patent
Wang et al.

(10) Patent No.: US 12,355,583 B2
(45) Date of Patent: Jul. 8, 2025

(54) METHOD, APPARATUS, DEVICE AND MEDIUM FOR ADDING GROUP MEMBERS

(71) Applicant: Beijing Zitiao Network Technology Co., Ltd., Beijing (CN)

(72) Inventors: Jiaxuan Wang, Beijing (CN); Junyi Yang, Beijing (CN); Qianmin Zhang, Beijing (CN); Jingting Wu, Beijing (CN); Lingyu Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/767,661

(22) Filed: Jul. 9, 2024

(65) Prior Publication Data
US 2024/0364556 A1    Oct. 31, 2024

Related U.S. Application Data

(63) Continuation of application No. PCT/CN2023/070872, filed on Jan. 6, 2023.

(30) Foreign Application Priority Data

Jan. 10, 2022  (CN) .................. 202210023409.X (51) Int. Cl.
*G06F 17/00* (2019.01)
*G06F 40/186* (2020.01)
(Continued)

(52) U.S. Cl.
CPC .......... *H04L 12/185* (2013.01); *G06F 40/186* (2020.01); *H04L 51/04* (2013.01)

(58) Field of Classification Search
CPC ..... H04L 12/185; H04L 51/04; H04L 51/046; G06F 40/186
See application file for complete search history.

(56) References Cited

U.S. PATENT DOCUMENTS 9,324,078 B2 *   4/2016  Palahnuk ............... G06Q 30/00
10,135,762 B2 * 11/2018  Korrub ................. H04L 51/214
(Continued)

FOREIGN PATENT DOCUMENTS

CN     100413354 C  *  8/2008
CN     101400020 A     4/2009
(Continued)

OTHER PUBLICATIONS

CN107040453A English translation, published Aug. 11, 2017, pp. 1-16 (Year: 2017).*

(Continued)

*Primary Examiner* — Laurie A Ries
(74) *Attorney, Agent, or Firm* — Astute IP Law Group (57) ABSTRACT

The present disclosure discloses a method for adding group members. When the first user needs to add a new member to the target group in the instant messaging system, in response to triggering of a first user, an imported target document is obtained, and the target document includes user information of one or more second users in an instant messaging system. After obtaining the target document, the target document is parsed to obtain user information of one or more second users included in the target document in the instant messaging system. After obtaining the user information through parsing, the one or more second users will be added to the target group in the instant messaging system based on the user information.

19 Claims, 5 Drawing Sheets

(51) Int. Cl.
*H04L 12/18* (2006.01)
*H04L 51/04* (2022.01)

(56) References Cited

U.S. PATENT DOCUMENTS

| | | | | |
|---|---|---|---|---|
| 11,449,815 | B2* | 9/2022 | Shakhnovich | G06Q 10/0633 |
| 11,954,426 | B2* | 4/2024 | Xu | G06F 40/103 |
| 2014/0351716 | A1* | 11/2014 | Steinbok | G06F 3/0484 |
| | | | | 715/753 |
| 2015/0244748 | A1* | 8/2015 | Alexander | H04L 51/04 |
| | | | | 715/758 |
| 2016/0330208 | A1* | 11/2016 | Chao | G06F 16/176 |
| 2017/0285890 | A1* | 10/2017 | Dolman | G06F 3/0482 |
| 2018/0260782 | A1* | 9/2018 | Bay | H04L 51/56 |
| 2020/0228477 | A1* | 7/2020 | Brown | H04L 51/216 |
| 2022/0029841 | A1* | 1/2022 | Zheng | H04L 12/189 |
| 2022/0261492 | A1* | 8/2022 | Gentilcore | G06F 16/9535 |
| 2023/0206179 | A1* | 6/2023 | Fong | G06F 21/6209 |
| | | | | 715/751 |
| 2023/0351032 | A1* | 11/2023 | Chen | G06F 21/6209 |
| 2024/0348566 | A1* | 10/2024 | Jiang | G06F 9/451 |

FOREIGN PATENT DOCUMENTS

| | | | | | |
|---|---|---|---|---|---|
| CN | 102299810 | A | | 12/2011 | |
| CN | 107040453 | A | * | 8/2017 | ............ H04L 51/04 |
| CN | 107566240 | A | * | 1/2018 | |
| CN | 109379274 | A | * | 2/2019 | ........... H04L 12/185 |
| CN | 109683728 | A | | 4/2019 | |
| CN | 109995543 | A | | 7/2019 | |
| CN | 110752984 | A | * | 2/2020 | ........... G06F 40/103 |
| CN | 111880858 | A | | 11/2020 | |
| CN | 112822430 | A | | 5/2021 | |
| CN | 113014476 | A | | 6/2021 | |
| CN | 108111401 | B | * | 9/2021 | ......... H04L 12/1822 |
| CN | 113779436 | A | | 12/2021 | |
| CN | 115022266 | A | | 9/2022 | |
| WO | 2013102545 | A1 | | 7/2013 | |

OTHER PUBLICATIONS

CN110752984A English translation, published Feb. 4, 2020, pp. 1-16 (Year: 2020).*

Chuang, et al., "How to add members in batches through Excel", Baidu Experience, 2020, 6 pages.

International Search Report for PCT/CN2023/070872, mailed Feb. 22, 2023, 6 pages.

Office Action for Chinese Patent Application No. 202210023409.X, mailed Nov. 2, 2023, 15 pages.

Zhou Jiawen, "Interactive Journalism Research", Chapter VIII Interactive News Production, 2021, pp. 155-161, 14 pages (7 pages of English Translation and 7 pages of Original Document).

"Chapter 4: Knowledge Management Technology", Knowledge Management Theory, Technology and Operations, Jan. 30, 2006, pp. 150-154, 10 pages (5 pages of English Translation and 5 pages of Original Document).

Notice of Allowance received for Chinese Patent Application No. 202210023409.X, mailed on Jun. 27, 2024, 12 pages (7 pages of English Translation and 5 pages of Original Document).

Feng, Jicheng, "Chapter 4: Knowledge Management Technology", Knowledge Management Theory, Technology and Operations, Jan. 30, 2006, pp. 150-154, 10 pages (5 pages of English Translation and 5 pages of Original Document).

* cited by examiner

METHOD, APPARATUS, DEVICE AND MEDIUM FOR ADDING GROUP MEMBERS

CROSS REFERENCE TO RELATED APPLICATIONS

This application is a continuation of International Patent Application No. PCT/CN2023/070872, filed on Jan. 6, 2023, which claims priority to Chinese Patent Application No. 202210023409.X, filed on Jan. 10, 2022, entitled "METHOD, APPARATUS, DEVICE AND MEDIUM FOR ADDING GROUP MEMBERS", both of which are incorporated in the present disclosure by reference in their entireties.

FIELD

The present disclosure relates to the field of computer technology, and specifically to a method, apparatus, device and medium for adding group members.

BACKGROUND

In order to improve work efficiency and speed of message spread, various types of internet conversation groups are established in actual work to communicate through internet conversation groups, such as conversation groups in instant messaging applications and conversation groups in network communities, or conversation groups in multimedia communication platforms, etc. Currently, when creating a group or adding a new member to an existing group, a user is required to manually select the member to be added. When the number of members to be added is large, it takes a lot of time, which affects work efficiency.

SUMMARY

In view of this, embodiments of the present disclosure provide a method, apparatus, device and medium for adding group members, so that group members can be rapidly added and thus the work efficiency is improved.

In order to achieve the above objectives, the technical solutions provided by the embodiments of the present disclosure are as follows:

In the first aspect of embodiments of the present disclosure, a method for adding group members is provided, and the method includes:
  in response to triggering of a first user, obtaining an imported target document, the target document including user information of one or more second users in an instant messaging system;
  parsing the target document and obtaining the user information of the one or more second users in the instant messaging system; and
  adding the one or more second users to a target group in the instant messaging system based on the user information.

In a second aspect of the present disclosure, an apparatus for adding group members is provided, and the apparatus includes:
  an obtaining unit configured to obtain an imported target document in response to triggering of a first user, the target document comprising user information of one or more second users in an instant messaging system;
  a parsing unit configured to parse the target document and obtain the user information of the one or more second users in the instant messaging system; and
  an adding unit configured to add the one or more second users to a target group in the instant messaging system based on the user information.

In a third aspect of embodiments of the present disclosure, an electronic device is provided, and the device includes: a processor and a memory;
  the memory is configured to store instructions or computer programs;
  the processor is configured to execute the instructions or computer programs in the memory, so that the electronic device executes the method for adding group members as described in the first aspect.

In a fourth aspect of embodiments of the present disclosure, a computer-readable storage medium is provided. The computer-readable storage medium stores instructions therein. When running on a device, the instructions cause the device to execute the method for adding group members as described in the first aspect.

In a fifth aspect of embodiments of the present disclosure, a computer program product is provided. When running on a computer, the computer program product causes the computer to execute the method for adding group members described in the first aspect.

It can be seen that the embodiments of the present disclosure have the following beneficial effects.

In the embodiments of the present disclosure, when the user needs to add a new member to the target group in the instant messaging system, in response to the triggering from the first user, the imported target document is obtained, and the target document includes user information of one or more second users in the instant messaging system. After obtaining the target document, the target document is parsed to obtain user information of one or more second users included in the target document in the instant messaging system. After obtaining the user information of one or more second users in the instant messaging system by parsing, the one or more second users are added to the target group based on the user information. It can be seen that through the technical solution provided by embodiments of the present disclosure, a plurality of second users can be added to the target group at one time through the target document, thus there is no need for the user to perform manual selection, thereby improving the work efficiency.

BRIEF DESCRIPTION OF THE DRAWINGS

In order to more clearly illustrate the technical solutions in the embodiments of the present disclosure or the prior art, the drawings needed to describe the embodiments or the prior art will be briefly introduced below. Obviously, the drawings in the following description are only used for the purpose of describing the embodiments of the present disclosure. For those skilled in the art, other drawings can also be obtained based on these drawings without creative labor.

DETAILED DESCRIPTION

In order to make those skilled in the art to better understand the solutions of the present disclosure, the technical solutions in the embodiments of the present disclosure will be clearly and completely described below in conjunction with the accompanying drawings in the embodiments of the present disclosure. Obviously, the described embodiments are only part of embodiments of the present disclosure, but not all the embodiments. Based on the embodiments in the present disclosure, all other embodiments obtained by those skilled in the art without creative efforts fall within the scope of protection of this disclosure.

In actual work, in order to improve communication efficiency, message groups will be established to achieve efficient communication through message groups. When establishing a group, the group owner needs to manually add group members to the group through a single click, thus the cost in adding members is high and the efficiency will be affected.

Based on this, embodiments of the present disclosure provide a method for adding group members, in which an import document template is predefined, and the user may enter member information that needs to be added in the document in advance. When it is necessary to add the member information, in response to triggering of a first user, the client obtains an imported target document, and parses the target document and obtains user information of one or more second users included in the target document in the instant messaging system. Then, the one or more second users obtained through parsing are added to the target group in the instant messaging system based on the obtained user information, thereby improving the adding efficiency.

In order to facilitate understanding of the technical solutions provided by the embodiments of the present disclosure, the following will be described with reference to the accompanying drawings.

Figure 1:
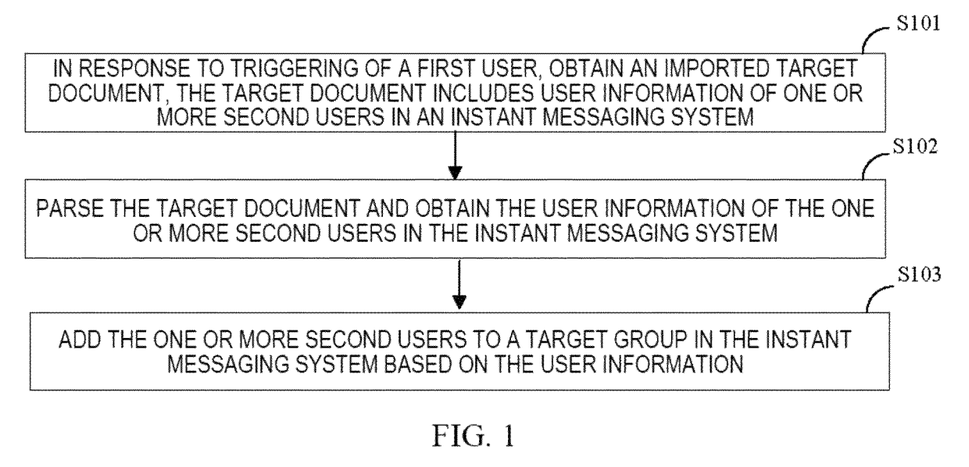
FIG. 1 is a flow chart of a method for adding group members provided by an embodiment of the present disclosure.

Refer to FIG. 1, FIG. 1 is a flow chart of a method for adding group members provided by an embodiment of the present disclosure. As shown in FIG. 1, this method can be executed by a device for adding group members. The device for adding the group members may be an electronic device or other device, which will not be limited herein. Among them, the electronic device may include a mobile phone, a tablet computer, a desktop computer, a notebook computer, a vehicle-mounted terminal, a wearable electronic device, an all-in-one machine, a smart home device or other device with communication functions, or the electronic device may be a device simulated by a virtual machine or simulator. As shown in FIG. 1, the method may include the following steps:

S101: in response to triggering of a first user, an imported target document is obtained, the target document including user information of one or more second users in an instant messaging system.

Figure 2A:
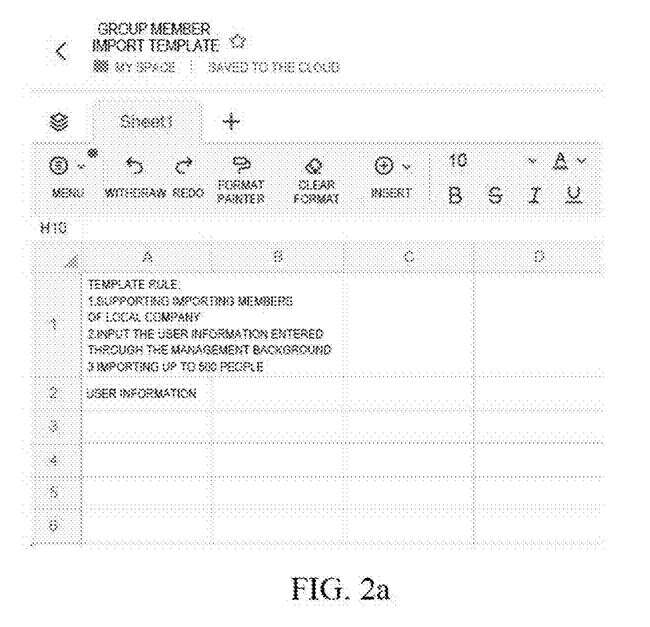
FIG. 2a is a schematic diagram of an import document template provided by an embodiment of the present disclosure.

In some embodiments, an import document template can be pre-defined. When the first user needs to add group members through the imported document, the first user first obtains the import document template, and enters user information of the second user to be added into the import document template according to a template rule. The user information is information of the second user in the instant messaging system. For example, the user information may be a user identification of the second user in the instant messaging system or the mobile phone number or email address used when the second user registering in the instant messaging system. For example, a template rule for the import document template shown in FIG. 2a includes: supporting importing members of the company only, inputting user information entered through the management background, and importing up to 500 people. Among them, the format of the target document can be a table or a Word document.

The type of the target document may include an online document and/or an offline document, and the user information included in different types of target documents may also be different. For example, when the type of the target document is an online document, the user information included therein may be a user identification (user-id) of the second user in the instant messaging system, and this user identification uniquely identifies one second user in the instant messaging system. And/or, the user information included in the target document is the information used when the second user registering in the instant messaging system. When the type of the target document is an offline document, the user information included therein is information used when the second user registering in the instant messaging system.

Figure 2B:
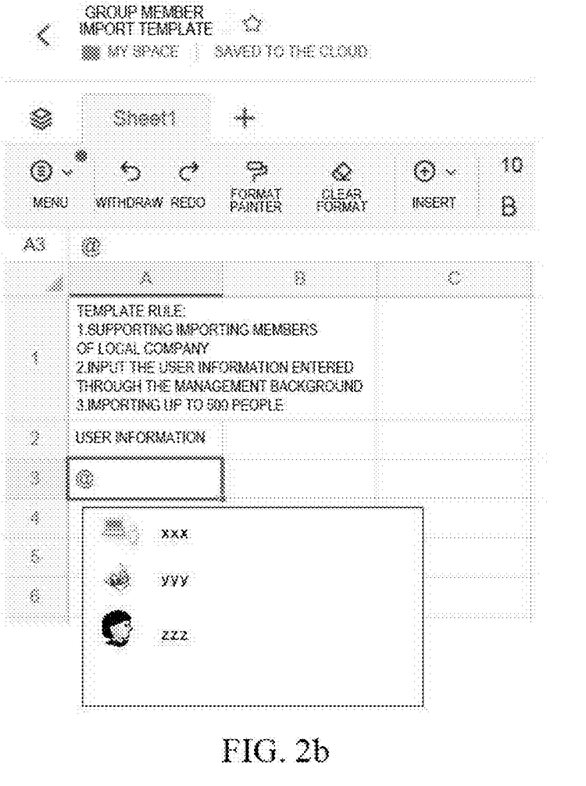
FIG. 2b is a schematic diagram of adding members provided by an embodiment of the present disclosure.

In some embodiments, when the type of the target document is an online document, the user information of the second user in the instant messaging system may be added to the target document through a predetermined shortcut key. For example, as shown in FIG. 2b, the first user may invoke the member information of the company where he or she works by inputting the @ symbol, and then select the user identification of the second user to be added. Alternatively, the first user inputs the user information used when the second user registering in the instant messaging system into the target document.

In some embodiments, when the type of the target document is an offline document, the first user may directly input the user information used when the second user registering in the instant messaging system into the target document.

Figure 3A:
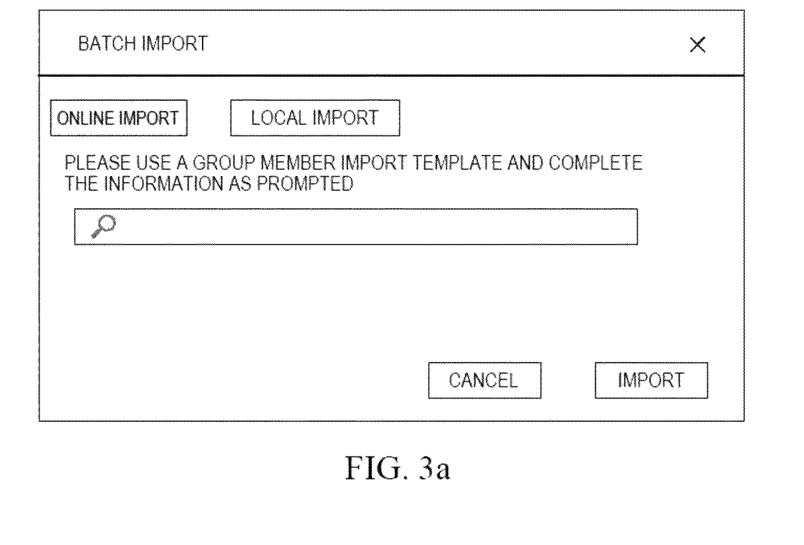
FIG. 3a is a schematic diagram of an online import page provided by an embodiment of the present disclosure.

After completing the entering of the target document, the first user may perform triggering on a batch import page to upload the target document. Specifically, in response to an import mode selected by the first user on the import page, the target document is obtained according to the import mode. There is a one-to-one correspondence between the import modes and the types of the target documents, including online import and local importing. Online import refers to importing online documents, and local import refers to importing offline documents saved locally. As shown in FIG. 3a, the batch import page includes two options: online import and local import, and the user may select according to actual needs.

Figure 3B:
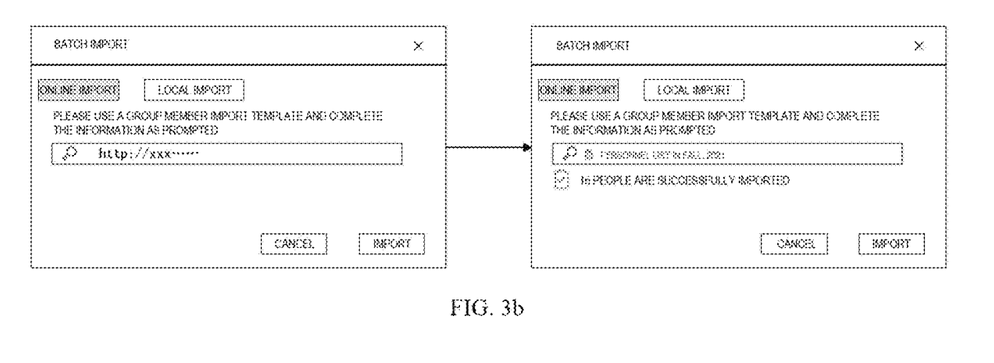
FIG. 3b is a schematic diagram of an online import application scenario provided by an embodiment of the present disclosure.

In one case, in response to online importing triggered by the first user on the import page, the document link input by the first user is obtained; after obtaining the document link, the target document is obtained by parsing the document link. As shown in FIG. 3b, after adding the document link to an input box for online import, the target document corresponding to the document link can be determined through parsing.

Figure 3C:
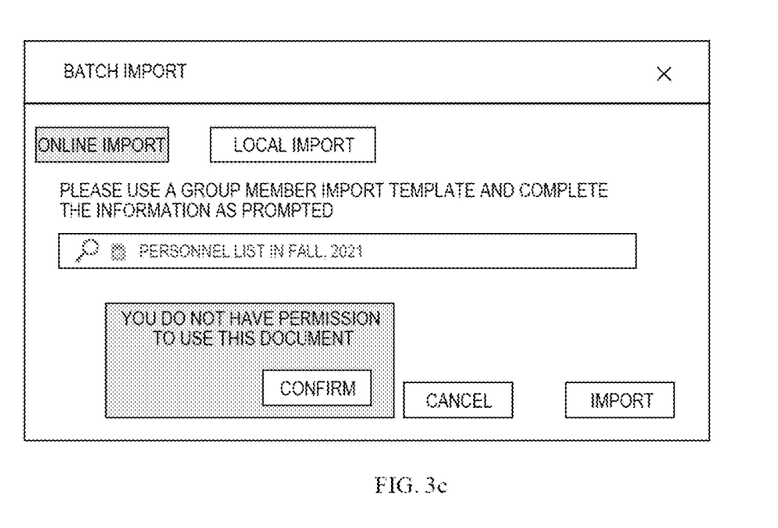
FIG. 3c is a schematic diagram of a local import page provided by an embodiment of the present disclosure.

In some embodiments, in order to ensure security of user information, after obtaining the target document, the usage permission on the target document can be judged, so that if the usage permission is available, the target document can be used to add group members in batches. Specifically, after parsing and obtaining the target document, it is determined whether the first user has an edit permission on the target document. If the first user does not have the edit permission, the first user may be prompt that he or she does not have the permission to use the target document by blocking a pop-up window. For example, as shown in FIG. 3c, after parsing and obtaining the target document, in response to the first user clicking anywhere on the batch import page, judgement on the usage permission on the target document will be invoked. When the first user does not have the usage permission, a prompt will be provided through the pop-up window.

In addition, when the first user does not have an edit permission on the target document, in order to enable the first user to use the target document to add members in batches, an permission application component may be displayed in the blocked pop-up window; in response to triggering by the first user on the permission application component, an application request is transmitted to the owner of the target document, the application request being configured to request the owner of the target document to grant the edit permission on the target document to the first user.

In some embodiments, after parsing and obtaining the target document, in response to triggering by the first user on the target document or an input box where the target document is located, the deletion component is displayed; in response to triggering by the first user on the deletion component, the parsed target document is deleted. That is, when the first user uploads an imported document by mistake or wants to replace the target document, in response to the first user operating the input box again, a deletion component may be displayed so that the first user deletes the uploaded target document by triggering the deletion component, and then performs replacement, so as to improve user experience. For example, when the first user operates the input box in FIG. 3b again, the deletion component may be displayed. After the first user operates the deletion component, the imported document becomes invalid and the input box returns to its initial state.

Figure 3D:
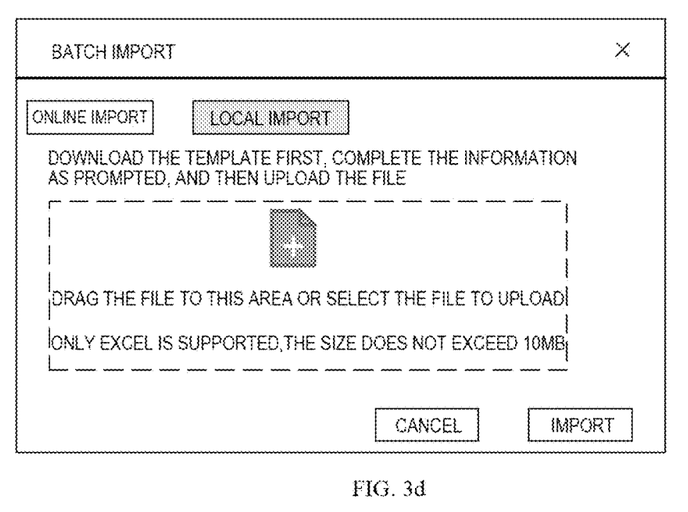
FIG. 3d is a schematic diagram of a local import application scenario provided by an embodiment of the present disclosure.

In another case, if the import mode selected by the user is the local import and after the first user triggers the local importing, the target document is obtained, and the type of the target document is an offline document. Among them, the local importing includes drag-and-drop uploading or click-to-uploading. As shown in FIG. 3d, when the first user selects local import, the target document can be uploaded by dragging or clicking an uploading component "+". Specifically, as shown in FIG. 3d, when the first user selects local import, the client may provide an import document template used for local import, and the first user may download the import document template through the client. After obtaining the import document template, the first user may complete the information according to the prompt of the import document template, and then generate the target document to be uploaded.

Figure 3E:
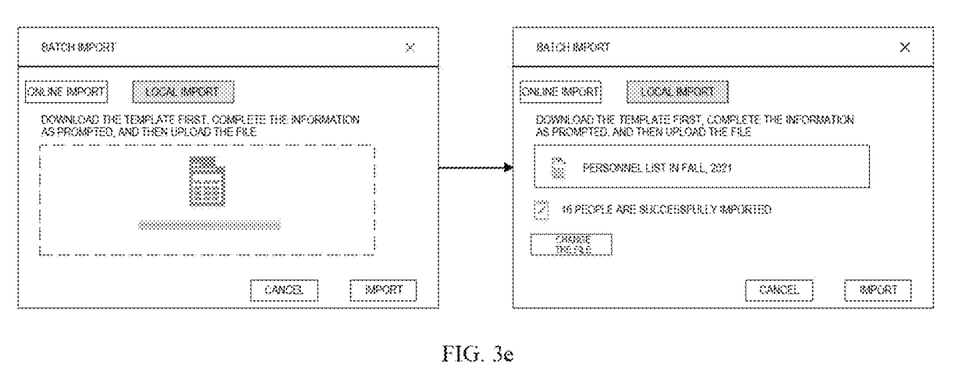
FIG. 3e is a schematic diagram of replacing the imported document provided by an embodiment of the present disclosure.

In some embodies, after uploading the target document, the target document is deleted in response to replacing triggered by the first user in the import page. Specifically, after the target document is uploaded, a replacement component may be displayed in the import page, and in response to the triggering by the first user on the replacement component, the uploaded target document is deleted so that the first user may upload another document. As shown in FIG. 3e, the replacement component is displayed in the rightmost import page.

S102: the target document is parsed and the user information of the one or more second users in the instant messaging system is obtained.

In this embodiment, after obtaining the target document, the target document will be parsed to obtain the user information of one or more second users included in the imported document in the instant messaging system.

In some embodiments, after reading from the target document the user information of one or more second users in the instant messaging system, it can be determined whether each of the user information complies with a predetermined rule; in response to the user information not complying with the predetermined rule, the location of the user information that does not comply with the predetermined rule in the target document is determined; and the location of the determined user information that does not comply with the predetermined rule in the target document is displayed. That is, this embodiment can locate the location of user information that does not comply with the predetermined rule.

Among them, the predetermined rule may be set according to the user information input into the target document. For example, the predetermined rule is that a bit number of the user information is a predetermined bit number or an expression format of the user information is a specific format. For example, the user information is a first identification information when the second user registering in the instant messaging system, which is 11 bits. When the first identification information of a certain second user in the target document is read as 10 bits, it is determined that the first identification information does not comply with the predetermined rule, and the location of the first identification information is determined, and a prompt is provided on the batch import page, so that the user can intuitively understand the location of the user information that does not comply with the predetermined rule. For another example, the user information is the second identification information used when the second user registering in the instant messaging system, and the second identification information has a specific expression format. If the second identification information of a certain second user in the target document does not comply with the specific expression format, it is determined that the second identification information of the second user does not comply with the predetermined rule, and then the location of the second identification information is determined.

In some embodiments, after parsing and obtaining the user information included in the target document, the number of users included in the target document can be displayed. For example, as shown in FIG. 3c and FIG. 3d, 16 people were successfully imported.

S103: the one or more second users are added to a target group in the instant messaging system based on the user information.

After parsing and obtaining the user information included in the target document, in response to importing triggered by the first user, the one or more second users are added to the target group in the instant messaging system based on the user information, thereby realizing importing of a plurality of users at once and thus improving the user experience.

In some embodiments, when the type of the target document is an online document and the user information in the target document is the user identification of the second user in the instant messaging system, the user identification is directly added to the target group in the instant messaging system based on the user information.

In some embodiments, when the type of the target document is an online document and the user information in the target document is not a user identification of the second user in the instant messaging system, the user identification of the second user in the instant messaging system is determined based on the user information and a specified correspondence; and the user identification is added to a target group in the instant messaging system. The user identification is configured to uniquely indicate the second user in the instant messaging system, and the specified correspondence includes the association between the user information and the user identification.

In some embodiments, when the user information in the target document is not the user identification of the second user in the instant messaging system but the information used when the second user registering in the instant messaging system, the instant messaging system will assign a user identification to the second user when receiving an application request from the second user and establish an association between the used information when registering and the user identification, and then save the above association. When the user information parsed from the target document is the information used when the second user registering in the instant messaging system, the user identification corresponding to the user information is determined using the above association and the user information.

As can be seen from the foregoing, when the type of the target document is an online document, the usage permission of the first user for the target document will be judged. In response to the first user having an edit permission on the target document, the user identification will be added to the target group of the instant messaging system.

In some embodiments, when the type of the target document is an offline document, generally, the user information of the second user included in the target document is not the user identification of the second user in the instant messaging system. In this case, adding the one or more second users to the target group in the instant messaging system based on the user information may specifically include: determining the user identification of the second user in the instant messaging system based on the user information and a specified correspondence; and adding the user identification to a target group in the instant messaging system. The user identification is configured to uniquely indicate the second user in the instant messaging system, and the specified correspondence includes an association between the user information and the user identification.

It should be noted that the first user may add members to the group by using batch import in a plurality of scenarios, such as scenarios of creating a new group or adding members to an existing group. Among them, the new group can include creating a group with "+" sign, creating a group with single chat, forwarding to create a group, etc.

It can be seen that when the first user needs to add new members to the target group, in response to the triggering of the first user, the imported target document is obtained, the target document includes information of one or more second users in the instant messaging system. After obtaining the target document, the target document is parsed to obtain user information of one or more second users included in the target document in the instant messaging system. After obtaining the user information by parsing, the one or more second users will be added to the target group in the instant messaging system based on the user information. It can be seen that through the technical solution provided by embodiments of the present disclosure, a plurality of second users can be added to the target group at one time through the imported documents, thus there is no need for the user to perform manual selection, thereby improving work efficiency.

Based on the above method embodiments, the embodiments of the present disclosure provide an apparatus and device for implementing the above method, which will be described below with reference to the accompanying drawings.

Figure 4:
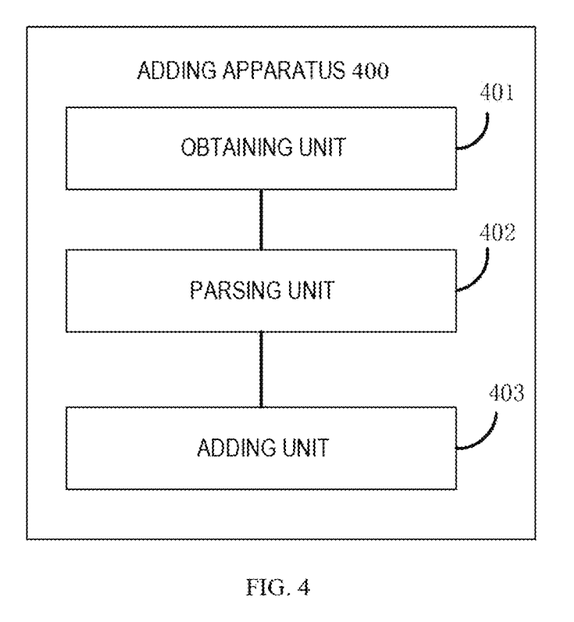
FIG. 4 is a schematic structural diagram of an apparatus for adding group members provided by an embodiment of the present disclosure.

Referring to FIG. 4, FIG. 4 is a structural diagram of an apparatus for adding group members provided by an embodiment of the present disclosure. As shown in FIG. 4, the apparatus 400 may include: an obtaining unit 401, a parsing unit 402 and an adding unit 403.

The obtaining unit 401 is configured to obtain an imported target document in response to triggering of a first user, where the target document includes user information of one or more second users in the instant messaging system.

The parsing unit 402 is configured to parse the target document and obtain the user information of the one or more second users in the instant messaging system.

The adding unit 403 is configured to add the one or more second users to the target group in the instant messaging system based on the user information.

In a specific implementation manner, the types of the target document include an online document and/or an offline document.

In a specific implementation, the obtaining unit 401 is specifically configured to obtain a document link input by the first user in response to online importing triggered by the first user on an import page and obtain a target document based on the document link, the type of the target document is an online document.

In a specific implementation manner, the adding unit 403 is specifically configured to add the user identification to the target group in the instant messaging system directly based on the user information when the user information is a user identification of the second user in the instant messaging system.

In a specific implementation manner, the adding unit 403 is specifically configured to, when the user information is not a user identification of the second user in the instant messaging system, determine the user identification of the second user in the instant messaging system based on the user information and a specified correspondence, the user identification is configured to uniquely indicate the second user in the instant messaging system, and the specified correspondence includes an association between the user information and the user identification; and add the user identification to the target group in the instant messaging system.

In a specific implementation, the adding unit 403 is specifically configured to, in response to the first user having an edit permission on the target document, add the user identification to the target group in the instant messaging system.

In a specific implementation, the apparatus further includes: a display unit and a transmitting unit.

The display unit is configured to, in response to the first user not having an edit permission on the target document, display a permission application component.

The transmitting unit is configured to, in response to triggering by the first user on the permission application component, transmit an application request to an owner of the target document, the application request is configured to request the owner of the target document to grant the edit permission on the target document to the first user.

In a specific implementation, the apparatus further includes: a display unit and a deletion unit.

The display unit is configured to, in response to triggering by the first user on the target document or on an input box where the target document is located, display a deletion component.

The deletion unit is configured to, in response to triggering by the first user on the deletion component, delete the target document.

In a specific implementation manner, the obtaining unit 401 is specifically configured to obtain a target document in response to local importing triggered by the first user on the import page, and the type of the target document is the offline document.

In a specific implementation, the adding unit 403 is specifically configured to determine determining a user identification of the second user in the instant messaging system based on the user information and a specified correspondence, the specified correspondence including an association between the user information and the user identification; and add the user identification to the target group in the instant messaging system.

In a specific implementation, the apparatus further includes a deletion unit.

The deletion unit is configured to delete the target document in response to replacing triggered by the first user in the import page.

In a specific implementation, the apparatus further includes a determining unit and a display unit.

The determining unit is configured to determine whether the user information complies with a predetermined rule after obtaining the user information of one or more second users in the instant messaging system.

The determining unit is further configured to, in response to the user information not complying with the predetermined rule, determine a location of the user information that does not comply with the predetermined rule in the target document.

The display unit is configured to display the location of the user information that does not comply with the predetermined rule in the target document.

In a specific implementation, the apparatus further includes a display unit.

The display unit is configured to display the number of second users included in the target document after parsing the target document and obtaining the user information of the one or more second users in the instant messaging system.

It should be noted that the implementation of each unit in this embodiment can be found in the relevant descriptions in the above method embodiments, and this embodiment will not be repeated here.

Figure 5:
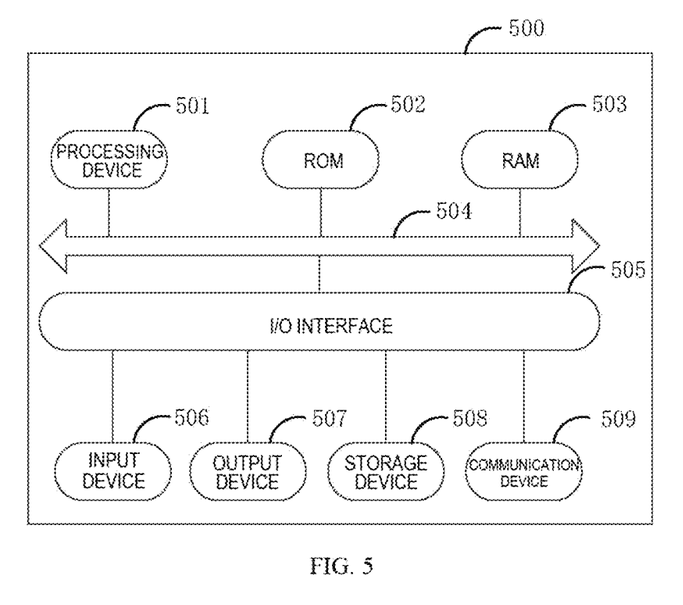
FIG. 5 is a schematic structural diagram of an electronic device provided by an embodiment of the present disclosure.

Referring to FIG. 5, it is a structural schematic diagram of an electronic device suitable for implementing the embodiment of the present disclosure. The terminal device 500 in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital TVs (television), desktop computers, etc. The electronic device shown in FIG. 5 is only an example and should not bring any limitation on the functionality and scope of use of the embodiment of the present disclosure.

As shown in FIG. 5, the electronic device 500 may include a processing device (such as a central processing unit, graphics processing unit, etc.) 501, which may perform various appropriate actions and processes based on programs stored in Read-Only Memory (ROM) 502 or loaded from storage device 508 into Random Access Memory (RAM) 503. In the RAM 503, various programs and data necessary for the operation of the electronic device 500 are also stored. The processing device 501, ROM 502, and RAM 503 are connected to each other through a bus 504. An Input/Output I/O interface 505 is also connected to the bus 504.

Typically, the following devices can be connected to I/O interface 505: input devices 506 including, for example, touch screens, touchpads, keyboards, mice, cameras, microphones, accelerometers, gyroscopes, etc.; output devices 507 including liquid crystal displays (LCDs), speakers, vibrators, etc.; storage devices 508 including magnetic tapes, hard disks, etc.; and a communication device 509. The communication device 509 may allow the electronic device 500 to communicate with other devices wirelessly or wirelessly to exchange data. Although FIG. 5 shows an electronic device 500 with a plurality of devices, it shall be understood that it is not required to implement or have all of the devices shown. More or fewer devices can be implemented or provided instead.

In particular, according to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 509, or installed from the storage device 508, or installed from the ROM 502. When the computer program is executed by the processing device 501, the above functions defined in the method of the embodiment of the present disclosure are performed.

The electronic device provided in this embodiment of the present disclosure and the method for adding group members provided in the above embodiments belongs to the invention idea. Technical details that are not described in detail in this embodiment can be found in the above embodiments, and this embodiment has the same beneficial effect as the above embodiments.

An embodiment of the present disclosure provides a computer storage medium on which a computer program is stored, when being executed by a processor, the program implements the method for adding group members provided in the above embodiments.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatuses, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (Hyper Text Transfer Protocol), and can be interconnected with any form or medium of digital data communication (such as communication networks). Examples of communication networks include local area networks ("LANs"), wide area networks ("WANs"), inter-networks (such as the Internet), and end-to-end networks (such as ad hoc end-to-end networks), as well as any currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device executes the above method for adding group members.

Computer program codes for performing the operations of the present disclosure may be written in one or more programming languages or a combination thereof, including but not limited to Object Oriented programming languages-such as Java, Smalltalk, C++, and also conventional procedural programming languages-such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network-including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case, for example, a first obtaining unit may also be described as "a unit for obtaining at least two internet protocol addresses".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, a method for adding group members is provided, and the method may include:

in response to triggering of a first user, obtaining an imported target document, the target document comprising user information of one or more second users in an instant messaging system;

parsing the target document and obtaining the user information of the one or more second users in the instant messaging system; and adding the one or more second users to a target group in the instant messaging system based on the user information.

According to one or more embodiments of the present disclosure, types of the target document may include an online document and/or an offline document.

According to one or more embodiments of the present disclosure, obtaining the imported target document in response to the triggering of the first user includes:

in response to online importing triggered by the first user on an import page, obtaining a document link input by the first user; and obtaining the target document based on the document link, a type of the target document being an online document.

According to one or more embodiments of the present disclosure, adding the one or more second users to the target group in the instant messaging system based on the user information includes:

based on the user information being a user identification of the second user in the instant messaging system, adding the user identification to the target group in the instant messaging system directly based on the user information.

According to one or more embodiments of the present disclosure, adding the one or more second users to the target group in the instant messaging system based on the user information includes:

based on the user information being not a user identification of the second user in the instant messaging system, determining the user identification of the second user in the instant messaging system based on the user information and a specified correspondence, the user identification being configured to uniquely indicate the second user in the instant messaging system, and the specified correspondence comprising an association between the user information and the user identification; and adding the user identification to the target group in the instant messaging system.

According to one or more embodiments of the present disclosure, adding the user identification to a target group in the instant messaging system includes:

in response to the first user having an edit permission on the target document, adding the user identification to the target group in the instant messaging system.

According to one or more embodiments of the present disclosure, the method further includes:

in response to the first user having no edit permission on the target document, displaying a permission application component; and in response to triggering by the first user on the permission application component, transmitting an application request to an owner of the target document, the application request being configured to request the owner of the target document to grant the edit permission on the target document to the first user.

According to one or more embodiments of the present disclosure, the method further includes:

in response to triggering by the first user on the target document or on an input box where the target document is located, displaying a deletion component; and in response to triggering by the first user on the deletion component, deleting the target document.

According to one or more embodiments of the present disclosure, in response to the triggering of the user, obtaining the imported target document includes:

in response to local importing triggered by the first user on an import page, obtaining the target document, a type of the target document being an offline document.

According to one or more embodiments of the present disclosure, adding the one or more second users to the target group in the instant messaging system based on the user information includes:

determining a user identification of the second user in the instant messaging system based on the user information and a specified correspondence, the specified correspondence comprising an association between the user information and the user identification; and adding the user identification to the target group in the instant messaging system.

According to one or more embodiments of the present disclosure, the method further includes:

in response to replacing triggered by the first user in the import page, deleting the target document.

According to one or more embodiments of the present disclosure, the method further includes after obtaining the user information of the one or more second users in the instant messaging system:

determining whether the user information complies with a predetermined rule;

in response to the user information not complying with the predetermined rule, determining a location of the user information that does not comply with the predetermined rule in the target document; and displaying the location of the user information that does not comply with the predetermined rule in the target document.

According to one or more embodiments of the present disclosure, the method further includes after parsing the target document and obtaining user information of one or more second users in the instant messaging system:

displaying the number of the second users included in the target document.

According to one or more embodiments of the present disclosure, an apparatus for adding group members is provided, and the apparatus may include:

an obtaining unit configured to obtain an imported target document in response to triggering of a first user, the target document comprising user information of one or more second users in an instant messaging system;

a parsing unit configured to parse the target document and obtain the user information of the one or more second users in the instant messaging system; and an adding unit configured to add the one or more second users to a target group in the instant messaging system based on the user information.

In one or more embodiments of the present disclosure, types of the target document include an online document and/or an offline document.

In one or more embodiments of the present disclosure, the obtaining unit is specifically configured to obtain the document link input by the first user in response to online importing triggered by the first user on an import page and obtain a target document based on the document link, the type of the target document is an online document.

In one or more embodiments of the present disclosure, the adding unit is specifically configured to add the user identification to the target group in the instant messaging system directly based on the user information when the user information is a user identification of the second user in the instant messaging system.

In one or more embodiments of the present disclosure, the adding unit is specifically configured to: when the user information is not a user identification of the second user in the instant messaging system, determine the user identification of the second user in the instant messaging system based on the user information and a specified correspondence, the user identification is configured to uniquely indicate the second user in the instant messaging system, and the specified correspondence includes an association between the user information and the user identification; and add the user identification to the target group in the instant messaging system.

In one or more embodiments of the present disclosure, the adding unit is specifically configured to, in response to the first user having an edit permission on the target document, add the user identification to the target group in the instant messaging system.

In one or more embodiments of the present disclosure, the apparatus further includes: a display unit and a transmitting unit;
the display unit is configured to, in response to the first user having no edit permission on the target document, display a permission application component; and
the transmitting unit is configured to, in response to triggering by the first user on the permission application component, transmit an application request to an owner of the target document, the application request is configured to request the owner of the target document to grant the edit permission on the target document to the first user.

In one or more embodiments of the present disclosure, the apparatus further includes: a display unit and a deletion unit;
the display unit is configured to, in response to triggering by the first user on the target document or on an input box where the target document is located, display a deletion component; and
the deletion unit is configured to, in response to triggering by the first user on the deletion component, delete the target document.

In one or more embodiments of the present disclosure, the obtaining unit is specifically configured to obtain a target document in response to local importing triggered by the first user on the import page, and the type of the target document is the offline document.

In one or more embodiments of the present disclosure, the adding unit is specifically configured to determine determining a user identification of the second user in the instant messaging system based on the user information and a specified correspondence, the specified correspondence including an association between the user information and the user identification; and add the user identification to the target group in the instant messaging system.

In one or more embodiments of the present disclosure, the device further includes: a deletion unit;
the deletion unit is configured to delete the target document in response to replacing triggered by the first user in the import page.

In one or more embodiments of the present disclosure, the device further includes a determining unit and a display unit;
the determining unit is configured to determine whether the user information complies with a predetermined rule after obtaining the user information of one or more second users in the instant messaging system;
the determining unit is further configured to, in response to the user information not complying with the predetermined rule, determine a location of the user information that does not comply with the predetermined rule in the target document; and
the display unit is configured to display the location of the user information that does not comply with the predetermined rule in the target document.

In one or more embodiments of the present disclosure, the apparatus further includes a display unit;
the display unit is configured to display the number of second users included in the target document after parsing the target document and obtaining the user information of the one or more second users in the instant messaging system.

According to one or more embodiments of the present disclosure, an electronic device is provided, and the device includes: a processor and a memory;
the memory is configured to store instructions or computer programs; and
the processor is configured to execute the instructions or computer programs in the memory, so that the electronic device executes the method for adding group members.

According to one or more embodiments of the present disclosure, a computer-readable storage medium is provided, and instructions are stored in the computer-readable storage medium, and when running on a device, the instruction causes the device to execute the method for adding group members.

It should be noted that various embodiments are described in the description in a progressive manner. Each embodiment is described focusing on its differences from other embodiments. The same and similar parts between the embodiments can be cross-referenced with each other. For systems or devices disclosed in the embodiments, the descriptions thereof are relatively simple as they correspond to the methods disclosed in the embodiments. For relevant details, please refer to the description of the section for method.

It should be understood that in this disclosure, "at least one" refers to one or more, and "a plurality of" refers to two or more. "And/or" is used to describe an association between associated objects, indicating that there can be three relationships therebetween. For example, "A and/or B" may indicate: only A exists, only B exists, and A and B exist simultaneously. where A and B can be singular or plural. The symbol "/" generally indicates that the related objects are in an "or" relationship. "At least one of the following (item)" or similar expressions thereof refers to any combination of the items, including any combination of a single item or a plurality of items. For example, at least one (item) of a, b or c may refer: a, b, c, "a and b", "a and c", "b and c", or "a and b and c", and a, b, c can be singular or plural.

It should also be noted that in this article, relational terms such as first and second are only used to distinguish one entity or operation from another entity or operation, which do not necessarily imply any actual relationship or sequence therebetween. Furthermore, the terms "comprises", "includes" and any other variations thereof are intended to cover a non-exclusive inclusion such that a process, method, article, or apparatus including a series of elements includes not only those elements, but also other elements not expressly listed, or elements inherent to the process, method, article or device. Without further limitation, elements defined by the statement "comprises a . . . " does not exclude the presence of additional identical elements in a process, method, article, or apparatus that includes the stated element.

The steps of the methods or algorithms described in conjunction with the embodiments disclosed herein may be implemented directly in hardware, in software modules executed by a processor, or in a combination of the two. Software modules may be located in random access memory (RAM), memory, read only memory (ROM), electrically programmable ROM, electrically erasable programmable ROM, registers, hard disks, removable disks, CD-ROMs, or any other form of storage media commonly known in the art.

The above description of the embodiments of the present disclosure enables those skilled in the art to implement or use the present disclosure. Various modifications to these embodiments will be apparent to those skilled in the art, and the general principles defined herein may be implemented in other embodiments without departing from the spirit or scope of the disclosure. Therefore, the present disclosure is not to be limited to the embodiments shown herein but shall comply with the widest scope consistent with the principles and novel features disclosed herein.

We claim:

1. A method for adding group members, comprising:
in response to triggering of a first user, obtaining an imported target document, the target document comprising user information of one or more second users in an instant messaging system;
parsing the target document and obtaining the user information of the one or more second users in the instant messaging system; and
adding the one or more second users to a target group in the instant messaging system based on the user information;
wherein in response to the triggering of the user, obtaining the imported target document comprises:
in response to local importing triggered by the first user on an import page, obtaining the target document, a type of the target document being an offline document.

2. The method of claim 1, wherein types of the target document comprise an online document and/or an offline document.

3. The method of claim 1, wherein in response to the triggering of the first user, obtaining the imported target document comprises:
in response to online importing triggered by the first user on an import page, obtaining a document link input by the first user; and
obtaining the target document based on the document link, a type of the target document being an online document.

4. The method of claim 3, wherein adding the one or more second users to the target group in the instant messaging system based on the user information comprises:
based on the user information being a user identification of the second user in the instant messaging system, adding the user identification to the target group in the instant messaging system directly based on the user information.

5. The method of claim 4, wherein adding the user identification to the target group in the instant messaging system comprises:
in response to the first user having an edit permission on the target document, adding the user identification to the target group in the instant messaging system.

6. The method of claim 3, wherein adding the one or more second users to the target group in the instant messaging system based on the user information comprises:
based on the user information being not a user identification of the second user in the instant messaging system, determining the user identification of the second user in the instant messaging system based on the user information and a specified correspondence, the user identification being configured to uniquely indicate the second user in the instant messaging system, and the specified correspondence comprising an association between the user information and the user identification; and
adding the user identification to the target group in the instant messaging system.

7. The method of claim 3, further comprising:
in response to the first user having no edit permission on the target document, displaying a permission application component; and
in response to triggering by the first user on the permission application component, transmitting an application request to an owner of the target document, the application request being configured to request the owner of the target document to grant the edit permission on the target document to the first user.

8. The method of claim 3, further comprising:
in response to triggering by the first user on the target document or on an input box where the target document is located, displaying a deletion component; and
in response to triggering by the first user on the deletion component, deleting the target document.

9. The method of claim 1, wherein adding the one or more second users to the target group in the instant messaging system based on the user information comprises:
determining a user identification of the second user in the instant messaging system based on the user information and a specified correspondence, the specified correspondence comprising an association between the user information and the user identification; and
adding the user identification to the target group in the instant messaging system.

10. The method of claim 9, further comprises:
in response to replacing triggered by the first user in the import page, deleting the target document.

11. The method of claim 1, wherein the method further comprises after obtaining the user information of the one or more second users in the instant messaging system:
determining whether the user information complies with a predetermined rule;
in response to the user information not complying with the predetermined rule, determining a location of the user information that failing to comply with the predetermined rule in the target document; and
displaying the location of the user information failing to comply with the predetermined rule in the target document.

12. The method of claim 1, wherein the method further comprises after parsing the target document and obtaining the user information of one or more second users in the instant messaging system:
displaying a number of the second users included in the target document.

13. The method of claim 1, wherein the method further comprises in response to the triggering of the first user and before obtaining the imported target document,
obtaining an import document template; and
entering user information of a second user to be added into the import document template based on a template rule, to obtain the target document.

14. An electronic device, comprising:
a processor and a memory;
the memory being configured to store instructions or computer programs,
the processor being configured to execute the instructions or computer programs in the memory, to cause the electronic device to perform acts comprising:
in response to triggering of a first user, obtaining an imported target document, the target document comprising user information of one or more second users in an instant messaging system;

parsing the target document and obtaining the user information of the one or more second users in the instant messaging system; and adding the one or more second users to a target group in the instant messaging system based on the user information;

wherein in response to the triggering of the user, obtaining the imported target document comprises:

in response to local importing triggered by the first user on an import page, obtaining the target document, a type of the target document being an offline document.

15. The electronic device of claim 14, wherein types of the target document comprise an online document and/or an offline document.

16. The electronic device of claim 14, wherein in response to the triggering of the first user, obtaining the imported target document comprises:

in response to online importing triggered by the first user on an import page, obtaining a document link input by the first user; and obtaining the target document based on the document link, a type of the target document being an online document.

17. The electronic device of claim 16, wherein adding the one or more second users to the target group in the instant messaging system based on the user information comprises:

based on the user information being a user identification of the second user in the instant messaging system, adding the user identification to the target group in the instant messaging system directly based on the user information.

18. The electronic device of claim 16, wherein adding the one or more second users to the target group in the instant messaging system based on the user information comprises:

based on the user information being not a user identification of the second user in the instant messaging system, determining the user identification of the second user in the instant messaging system based on the user information and a specified correspondence, the user identification being configured to uniquely indicate the second user in the instant messaging system, and the specified correspondence comprising an association between the user information and the user identification; and adding the user identification to the target group in the instant messaging system.

19. A non-transitory computer-readable storage medium storing instructions therein, the instructions, upon running on a device, causing the device to perform acts comprising:

in response to triggering of a first user, obtaining an imported target document, the target document comprising user information of one or more second users in an instant messaging system;

parsing the target document and obtaining the user information of the one or more second users in the instant messaging system; and adding the one or more second users to a target group in the instant messaging system based on the user information;

wherein in response to the triggering of the user, obtaining the imported target document comprises:

in response to local importing triggered by the first user on an import page, obtaining the target document, a type of the target document being an offline document.

* * * * *